US012482594B2

(12) United States Patent
Hirukawa et al.

(10) Patent No.: US 12,482,594 B2
(45) Date of Patent: Nov. 25, 2025

(54) MULTILAYER COIL COMPONENT

(71) Applicant: Murata Manufacturing Co., Ltd., Kyoto-fu (JP)

(72) Inventors: Atsuo Hirukawa, Nagaokakyo (JP); Kenjirou Koshiji, Nagaokakyo (JP); Shun Takai, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 827 days.

(21) Appl. No.: 17/839,002

(22) Filed: Jun. 13, 2022

(65) Prior Publication Data

US 2022/0399152 A1 Dec. 15, 2022

(30) Foreign Application Priority Data

Jun. 14, 2021 (JP) ................................ 2021-098892

(51) Int. Cl.

| | |
|---|---|
| ***H01F 27/28*** | (2006.01) |
| ***H01F 27/29*** | (2006.01) |
| ***H01F 27/32*** | (2006.01) |
| ***H01F 41/12*** | (2006.01) |

(52) U.S. Cl.

CPC ......... *H01F 27/2804* (2013.01); *H01F 27/29* (2013.01); *H01F 27/323* (2013.01); *H01F 41/122* (2013.01); *H01F 2027/2809* (2013.01)

(58) Field of Classification Search

CPC ......... H01F 27/2804; H01F 2027/2809; H01F 17/0013; H01F 17/0006; H01F 5/003; H01F 27/29; H01F 27/323

USPC .................................................. 336/200, 232

See application file for complete search history.

(56) References Cited

U.S. PATENT DOCUMENTS

| | | | | |
|---|---|---|---|---|
| 12,033,786 | B2 * | 7/2024 | Lee | H01F 17/0013 |
| 2002/0167389 | A1 | 11/2002 | Uchikoba et al. | |
| 2005/0023501 | A1 * | 2/2005 | Ishida | H01F 41/0246 252/62.62 |
| 2009/0278627 | A1 | 11/2009 | Umemoto et al. | |
| 2012/0119867 | A1 | 5/2012 | Odahara et al. | |
| 2017/0154720 | A1 * | 6/2017 | Ohkubo | H01F 17/04 |
| 2017/0345552 | A1 | 11/2017 | Nakano et al. | |

(Continued)

FOREIGN PATENT DOCUMENTS

| | | |
|---|---|---|
| JP | H06-77022 A | 3/1994 |
| JP | 2011-114173 A | 6/2011 |

(Continued)

*Primary Examiner* — Tszfung J Chan

(74) *Attorney, Agent, or Firm* — Studebaker Brackett PLLC

(57) ABSTRACT

A multilayer coil component includes a multilayer body in which a plurality of insulating layers are stacked in a stacking direction and a coil inside, and outer electrodes on surfaces of the multilayer body and electrically connected to the coil. The insulating layers have a magnetic phase having spinel structure containing at least Fe, Ni, Zn, and Cu and a non-magnetic phase containing at least Si. When grain sizes D50 and D90 of crystal grains constituting the magnetic phase are respectively defined as equivalent-area circle diameters of 50% and 90% on a cumulative sum basis in a cumulative distribution of equivalent-area circle diameters of the crystal grains, the grain size D50 is from 50 nm to 750 nm, and the grain size D90 is from 200 nm to 1500 nm.

3 Claims, 5 Drawing Sheets

(56) References Cited

U.S. PATENT DOCUMENTS

| | | | | |
|---|---|---|---|---|
| 2019/0161398 | A1* | 5/2019 | Kaneko | C03C 14/004 |
| 2019/0304656 | A1* | 10/2019 | Hirukawa | H01F 27/2804 |
| 2022/0375675 | A1* | 11/2022 | Saito | H01F 41/046 |

FOREIGN PATENT DOCUMENTS

| | | | | | |
|---|---|---|---|---|---|
| JP | 2017-212372 | A | | 11/2017 | |
| JP | 2018035027 | A | * | 3/2018 | C01G 53/82 |
| JP | 2019-186255 | A | | 10/2019 | |

* cited by examiner

MULTILAYER COIL COMPONENT

CROSS-REFERENCE TO RELATED APPLICATION

This application claims benefit of priority to Japanese Patent Application No. 2021-098892, filed Jun. 14, 2021, the entire content of which is incorporated herein by reference.

BACKGROUND

Technical Field

The present disclosure relates to a multilayer coil component.

Background Art

Japanese Unexamined Patent Application Publication No. 2019-186255 discloses a multilayer coil component that includes a multilayer body formed by stacking a plurality of insulating layers and having a coil built into the inside thereof, and outer electrodes.

It is stated that this multilayer coil component has excellent high-frequency characteristics and the transmission coefficient S21 at 40 GHz and 50 GHz is greater than or equal to a specific value.

In response to the increasing communication speed and increasing communication capacity of electronic devices in recent years, it is demanded that multilayer coil components have satisfactory high-frequency characteristics in higher frequency bands (for example, a GHz band from 60 GHz).

In the multilayer coil component disclosed in Japanese Unexamined Patent Application Publication No. 2019-186255, a ferrite material is used as the material of insulating layers of the multilayer coil component. Ferrite materials have a high relative dielectric constant of around 15 and therefore a multilayer coil component that uses a ferrite material has large loss in a frequency range around 60 GHz and further improvements in high-frequency characteristics are desired.

SUMMARY

The present disclosure provides a multilayer coil component that has excellent high-frequency characteristics.

A multilayer coil component of the present disclosure includes a multilayer body in which a plurality of insulating layers are stacked in a stacking direction and inside of which a coil is provided, and outer electrodes provided on surfaces of the multilayer body and electrically connected to the coil. The multilayer body has a first end surface and a second end surface, which face each other in a length direction, a first main surface and a second main surface, which face each other in a height direction perpendicular to the length direction, and a first side surface and a second side surface, which face each other in a width direction perpendicular to the length direction and the height direction. The outer electrodes include a first outer electrode that extends from at least part of the first end surface of the multilayer body across part of the first main surface and a second outer electrode that extends from at least part of the second end surface of the multilayer body across part of the first main surface. The stacking direction of the multilayer body and a coil axis of the coil are parallel to the first main surface. The insulating layers have magnetic phase having a spinel structure containing at least Fe, Ni, Zn, and Cu and a non-magnetic phase containing at least Si. When grain sizes D50 and D90 of crystal grains constituting the magnetic phase are respectively defined as equivalent-area circle diameters of 50% and 90% on a cumulative sum basis in a cumulative distribution of equivalent-area circle diameters of the crystal grains, the grain size D50 is from 50 nm to 750 nm, and the grain size D90 is from 200 nm to 1500 nm.

According to the present disclosure, a multilayer coil component can be provided that has excellent high-frequency characteristics.

DETAILED DESCRIPTION

Hereafter, a multilayer coil component of the present disclosure will be described.

However, the present disclosure is not limited to the following configurations and modes and the present disclosure can be applied with appropriate modifications within a range that does not alter the gist of the present disclosure. Combinations of two or more preferable configurations or modes of the present disclosure described hereafter are also included in the scope of the present disclosure.

Figure 1:
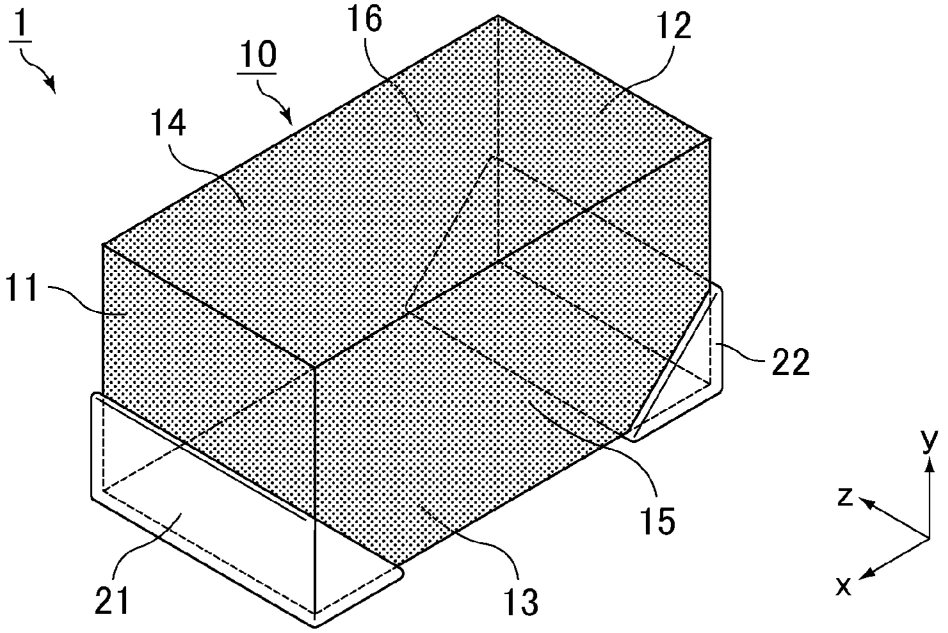
FIG. 1 is a perspective view schematically illustrating an example of a multilayer coil component of the present disclosure.

FIG. 1 is a perspective view schematically illustrating an example of a multilayer coil component of the present disclosure.

A multilayer coil component 1 illustrated in FIG. 1 includes a multilayer body 10, a first outer electrode 21, and a second outer electrode 22. The multilayer body 10 has a substantially rectangular parallelepiped shape having six surfaces. The configuration of the multilayer body 10 will be described later, but the multilayer body 10 is formed by stacking a plurality of insulating layers in the stacking direction and has a coil provided thereinside. The first outer electrode 21 and the second outer electrode 22 are electrically connected to the coil.

In a multilayer coil component and a multilayer body described in the present specification, a length direction, a height direction, and a width direction are respectively taken to be an x direction, a y direction, and a z direction in FIG.

1. Here, the length direction (x direction), the height direction (y direction), and the width direction (z direction) are perpendicular to each other.

The length direction (x direction) is a direction that is parallel to the stacking direction.

As illustrated in FIG. 1, the multilayer body 10 has a first end surface 11 and a second end surface 12, which face each other in the length direction (x direction), a first main surface 13 and a second main surface 14, which face each other in the height direction (y direction) perpendicular to the length direction, and a first side surface 15 and a second side surface 16, which face each other in the width direction (z direction) perpendicular to the length direction and the height direction.

Although not illustrated in FIG. 1, corner portions and edge portions of the multilayer body 10 are preferably rounded. The term "corner portion" refers to a part of the multilayer body where three surfaces intersect and the term "edge portion" refers to a part of the multilayer body where two surfaces intersect.

The first outer electrode and the second outer electrode are outer electrodes that extend along a main surface of the multilayer body from at least part of each end surface of the multilayer body.

In the multilayer coil component 1 illustrated in FIG. 1, the first outer electrode 21 is disposed so as to cover part of the first end surface 11 of the multilayer body 10 and so as to extend from the first end surface 11 and cover part of the first main surface 13.

The first outer electrode 21 covers a region of the first end surface 11 including an edge portion that intersects the first main surface 13.

In FIG. 1, the height of the part of the first outer electrode 21 that covers the first end surface 11 of the multilayer body 10 is constant, but the shape of the first outer electrode 21 is not particularly limited so long as the first outer electrode 21 covers part of the first end surface 11 of the multilayer body 10. For example, the first outer electrode 21 may have an arch-like shape that increases in height from the ends toward the center thereof on the first end surface 11 of the multilayer body 10. In addition, the length of the part of the first outer electrode 21 that covers the first main surface 13 of the multilayer body 10 is constant, but the shape of the first outer electrode 21 is not particularly limited so long as the first outer electrode 21 covers part of the first main surface 13 of the multilayer body 10. For example, the first outer electrode 21 may have an arch-like shape that increases in length from the ends toward the center thereof on the first main surface 13 of the multilayer body 10.

As illustrated in FIG. 1, the first outer electrode 21 may be additionally disposed so as to extend from the first end surface 11 and the first main surface 13 and cover part of the first side surface 15 and part of the second side surface 16. In this case, the parts of the first outer electrode 21 covering the first side surface 15 and the second side surface 16 are preferably formed in a diagonal shape relative to both the edge portions that intersect the first end surface 11 and the edge portions that intersect the first main surface 13. However, the first outer electrode 21 does not have to be disposed so as to cover part of the first side surface 15 and part of the second side surface 16.

In the multilayer coil component 1 illustrated in FIG. 1, the second outer electrode 22 is disposed so as to cover part of the second end surface 12 of the multilayer body 10 and so as to extend from the second end surface 12 and cover part of the first main surface 13.

Similarly to the first outer electrode 21, the second outer electrode 22 covers a region of the second end surface 12 that includes the edge portion that intersects the first main surface 13.

Similarly to the first outer electrode 21, the shape of the second outer electrode 22 is not particularly limited so long as the second outer electrode 22 covers part of the second end surface 12 of the multilayer body 10. For example, the second outer electrode 22 may have an arch-like shape that increases in height from the ends toward the center thereof on the second end surface 12 of the multilayer body 10. Furthermore, the shape of the second outer electrode 22 is not particularly limited so long as the second outer electrode 22 covers part of the first main surface 13 of the multilayer body 10. For example, the second outer electrode 22 may have an arch-like shape that increases in length from the ends toward the center thereof on the first main surface 13 of the multilayer body 10.

Similarly to the first outer electrode 21, the second outer electrode 22 may be additionally disposed so as to extend from the second end surface 12 and the first main surface 13 and cover part of the first side surface 15 and part of the second side surface 16. In this case, the parts of the second outer electrode 22 covering the first side surface 15 and the second side surface 16 are preferably formed in a diagonal shape relative to both the edge portions that intersect the second end surface 12 and the edge portions that intersect the first main surface 13. However, the second outer electrode 22 does not have to be disposed so as to cover part of the first side surface 15 and part of the second side surface 16.

The first outer electrode 21 and the second outer electrode 22 are disposed in the manner described above, and therefore the first main surface 13 of the multilayer body 10 serves as a mounting surface when the multilayer coil component 1 is mounted on a substrate.

Furthermore, different from the form illustrated in FIG. 1, the first outer electrode may cover the entirety of the first end surface of the multilayer body and may extend from the first end surface and cover part of the first main surface, part of the second main surface, part of the first side surface, and part of the second side surface.

In addition, the second outer electrode may cover the entirety of the second end surface of the multilayer body and may extend from the second end surface and cover part of the first main surface, part of the second main surface, part of the first side surface, and part of the second side surface.

In this case, any one out of the first main surface, the second main surface, the first side surface, and the second side surface of the multilayer body may serve as a mounting surface.

Although the size of the multilayer coil component of the present disclosure is not particularly limited, the multilayer coil component is preferably the 0603 size, the 0402 size, or the 1005 size.

The insulating layers have a magnetic phase having a spinel structure containing at least Fe, Ni, Zn, and Cu and a non-magnetic phase containing at least Si.

The dielectric constant of the insulating layers can be reduced as a result of the insulating layers constituting the multilayer coil component containing a non-magnetic phase containing at least Si. This reduction in the dielectric constant of the insulating layers results in loss of the multilayer coil component caused by LC resonance being reduced. Specifically, a drop in the transmission coefficient S21 caused by LC resonance is shifted in the direction towards higher frequencies, and the transmission coefficient S21 in a frequency range up to 60 GHz, for example, can be improved. Therefore, the multilayer coil component of the present disclosure is a multilayer coil component having excellent high-frequency characteristics.

In addition, as a result of the insulating layers constituting the multilayer coil component including a non-magnetic phase containing at least Si, grain growth (necking) of the magnetic material is inhibited by the non-magnetic material during the stage of firing the multilayer body, and the grain size of the crystal grains constituting the magnetic phase becomes smaller. It is thought that the relative dielectric constant of the insulating layers is lower than a theoretical relative dielectric constant of the insulating layers calculated from the volume ratio of the magnetic phase and the non-magnetic phase due to the smaller grain size of the crystal grains constituting the magnetic phase. In other words, it is thought that the smaller grain size of the crystal grains constituting the magnetic phase also contributes to an improvement in the high-frequency characteristics of the multilayer coil component.

More specifically, when grain sizes D50 and D90 of the crystal grains constituting the magnetic phase are respectively defined as equivalent-area circle diameters of 50% and 90% on a cumulative sum basis in a cumulative distribution of the equivalent-area circle diameters of the crystal particles, the grain size D50 is from 50 nm to 750 nm and the grain size D90 is from 200 nm to 1500 nm in the multilayer coil component of the present disclosure.

When the grain sizes D50 and D90 of the crystal grains constituting the magnetic phase satisfy the above ranges, excellent high-frequency characteristics can be realized and the transmission coefficient S21 can be improved in a frequency range up 60 GHz, for example.

If the grain size D50 of the crystal grains constituting the magnetic phase is less than 50 nm, the strength of the multilayer body may be degraded.

Similarly, if the grain size D90 of the crystal grains constituting the magnetic phase is less than 200 nm, the strength of the multilayer body may be degraded.

If the grain size D50 of the crystal grains constituting the magnetic phase exceeds 750 nm, the transmission coefficient S21 in a frequency range up to 60 GHz, for example, may be insufficient.

Similarly, if the grain size D90 of the crystal grains constituting the magnetic phase exceeds 1500 nm, the transmission coefficient S21 in a frequency range up to 60 GHz, for example, may be insufficient.

The grain size D50 is preferably from 80 nm to 400 nm, and more preferably from 150 nm to 300 nm.

The grain size D90 is preferably from 250 nm to 700 nm, and more preferably from 350 nm to 550 nm.

The difference between the grain size D50 and the grain size D90 (D90-D50) is not particularly limited, but is preferably from 100 nm to 800 nm, more preferably from 150 nm to 300 nm, and still more preferably from 200 nm to 250 nm.

The smaller this difference is, the more greatly the dielectric constant of the insulating layers can be reduced.

The transmission coefficient S21 is obtained from the ratio of the power of a transmitted signal to the power of an input signal. The transmission coefficient S21 is basically a dimensionless quantity, but is usually expressed in dB using the common logarithm.

The transmission coefficient S21 at each frequency is obtained by measuring the powers of an input signal and a transmitted signal of the multilayer coil component using a network analyzer. The transmission coefficient S21 at each frequency can be obtained by obtaining the transmission coefficient S21 while varying the frequency.

A specific example of a measurement device used for measuring the transmission coefficient S21 will be described in the Examples section.

From the viewpoint of reducing the dielectric constant of the insulating layers compared to the theoretical dielectric constant as described above, it is preferable that crystallites contained in the crystal grains constituting the magnetic phase are also small.

The size of the crystallites (crystallite diameter) can be calculated using the Scherrer equation from the width of a diffraction peak obtained through X-ray diffraction and the size of the crystallites constituting the crystal grains decreases the broader the diffraction peak is.

Therefore, from the viewpoint of realizing excellent high-frequency characteristics by reducing the relative dielectric constant of the insulating layers, the full width at half maximum of the diffraction peak of the magnetic phase is preferably large.

More specifically, the full width at half maximum of the diffraction peak originating from a (642) plane of the magnetic phase obtained through X-ray diffraction using the Cu-K$\alpha$1 line, i.e., the (642) plane of the above-mentioned spinel structure, is preferably from 0.2° to 0.5°.

It is considered that when the full width at half maximum of the diffraction peak originating from the (642) plane of the magnetic phase is from 0.2° to 0.5°, the crystallites contained in the crystal grains constituting the magnetic phase can be made smaller and the relative dielectric constant of the insulating layers can be reduced from the theoretical relative dielectric constant compared to the case where the insulating layers are formed of only a magnetic phase having a spinel structure containing at least Fe, Ni, Zn, and Cu.

If the full width at half maximum of the diffraction peak originating from the (642) plane of the magnetic phase is less than 0.2°, the transmission coefficient S21 in a frequency range up to 60 GHz, for example, may be insufficient.

If the full width at half maximum of the diffraction peak originating from the (642) plane of the magnetic phase exceeds 0.5°, the strength of the multilayer body may be degraded, the magnetic permeability may be reduced, and consequently, the transmission coefficient S21 may be insufficient.

The full width at half maximum of the diffraction peak originating from the (642) plane of the magnetic phase is preferably from 0.3° to 0.45° and more preferably from 0.35° to 0.40°.

The magnetic phase is a phase containing a magnetic material having a spinel structure and the magnetic phase contains at least Fe, Ni, Zn, and Cu. The magnetic phase may be a phase composed of only a magnetic material having a spinel structure.

The magnetic phase may additionally contain Co, Bi, Sn, Mn, and so on.

The magnetic material having a spinel structure is preferably a Ni—Cu—Zn-based ferrite material and the magnetic phase is preferably composed of a Ni—Cu—Zn-based ferrite material. The inductance of the multilayer coil component is increased when the magnetic phase is composed of a Ni—Cu—Zn-based ferrite material.

The Ni—Cu—Zn-based ferrite material may further include additives such as Co, Bi, Sn, and Mn and unavoidable impurities.

Furthermore, the magnetic phase is a phase containing Fe, Ni, Zn, and Cu when analyzed elementally. Furthermore, the magnetic phase may be a phase further containing Co, Bi, Sn, Mn, and so on when analyzed elementally.

The magnetic phase preferably contains Fe at from 40 mol % to 49.5 mol % in terms of $Fe_2O_3$, Zn at from 2 mol % to 35 mol % in terms of ZnO, Cu at from 6 mol % to 13 mol % in terms of CuO, and Ni at from 10 mol % to 45 mol % in terms of NiO.

The non-magnetic phase is a phase containing a non-magnetic material and contains at least Si. The non-magnetic phase may be a phase composed of only a non-magnetic material.

Examples of the non-magnetic material constituting the non-magnetic phase include glass materials, forsterite ($2MgO—SiO_2$), and wilmite ($aZnO-SiO_2$ (where a is from 1.8 to 2.2)).

Note that, in this specification, a "non-magnetic phase containing at least Si" may be composed of only a phase containing Si or may be composed of a phase containing Si and a phase not containing Si. For example, a crystal phase not containing Si may be the phase not containing Si.

The non-magnetic phase preferably contains a glass material. When the non-magnetic phase contains a glass material, grain growth (necking) of the magnetic material is effectively inhibited during the stage of firing the multilayer body and the grain size of the crystal grains constituting the magnetic phase can be reduced.

Borosilicate glass is preferably used as the glass material.

The borosilicate glass preferably contains Si at from 70 wt % to 85 wt % in terms of $SiO_2$, B at from 10 wt % to 25 wt % in terms of $B_2O_3$, an alkali metal A at from 0.5 wt % to 5 wt % in terms of $A_2O$, and Al at from 0 wt % to 5 wt % in terms of $Al_2O_3$. K, Na, or the like may be used as the alkali metal A.

The non-magnetic phase may further contain forsterite ($2MgO—SiO_2$), quartz ($SiO_2$), and so on as filler.

The magnetic phase and the non-magnetic phase can be distinguished from each other as follows. First, a cross section of the multilayer body of the multilayer coil component along the stacking direction is exposed by grinding down the multilayer body and then elemental mapping is performed on the multilayer body by performing scanning transmission electron microscopy-energy dispersive X-ray analysis (STEM-EDX). Then, the two phases are distinguished from each other by regarding regions where the element Fe, the element Ni, the element Zn, and the element Cu are present as regions constituting the magnetic phase and regions other than those making up the magnetic phase as regions constituting the non-magnetic phase.

A cross section taken along the stacking direction is a cross section like that illustrated in FIG. 2 described later.

The non-magnetic material constituting the non-magnetic phase preferably has a lower dielectric constant than the magnetic material constituting the magnetic phase.

The relative dielectric constant of the magnetic material may be, for example, from 14.0 to 15.5.

The relative dielectric constant of the non-magnetic material is preferably lower than the relative dielectric constant of the magnetic material, and is for example, preferably 7.0 or lower and more preferably 5.0 or lower. The lower limit of the relative dielectric constant of the non-magnetic material is not particularly limited, and may be 3.5 or higher, for example.

The structural formula of the magnetic material constituting the magnetic phase is determined and the structural formula of the non-magnetic material constituting the non-magnetic phase is determined by performing the above-mentioned element mapping in order to determine the relative dielectric constant of the magnetic material and the relative dielectric constant of the non-magnetic material. Then, the relative dielectric constants of compounds having these structural formulas are obtained from a publicly available database. The relative dielectric constant of the magnetic material and the relative dielectric constant of the non-magnetic material can be determined using this procedure.

In addition, the relative dielectric constant of the magnetic material may be measured under prescribed conditions by manufacturing a dielectric constant measurement test piece by molding the magnetic material into a prescribed shape and then forming electrodes on the test piece. Similarly the relative dielectric constant of the non-magnetic material may be measured by manufacturing a dielectric constant measurement test piece by molding the non-magnetic material into a prescribed shape.

The ratio of the volume of the non-magnetic phase to the total volume of the magnetic phase and the non-magnetic phase is preferably from 50 vol % to 90 vol %, more preferably from 60 vol % to 90 vol %, and still more preferably from 70 vol % to 90 vol %.

The ratio of the volume of the non-magnetic phase to the total volume of the magnetic phase and the non-magnetic phase is determined in the following way. First, a cross section of the multilayer body of the multilayer coil component along the stacking direction is exposed by grinding down the multilayer body up to a center part thereof in a direction perpendicular to the stacking direction.

Next, the magnetic phase and the non-magnetic phase are distinguished from each other as described above by extracting three 50 μm square regions from the vicinity of the center of the exposed cross section and subjecting the regions to elemental mapping using scanning transmission electron microscopy-energy dispersive X-ray analysis. Then, the ratio of the area of the non-magnetic phase to the total area of the magnetic phase and the non-magnetic phase is measured using image analysis software from the obtained elemental mapping image for each of the three regions described above. After that, an average value is calculated from the measured values of these area ratios and this average value is taken to be the ratio of the volume of the non-magnetic phase to the total volume of the magnetic phase and the non-magnetic phase.

Furthermore, the ratio of the volume of forsterite to the total volume of the non-magnetic phase is preferably from 2 vol % to 8 vol %.

The ratio of the volume of forsterite contained in the non-magnetic phase can be obtained by distinguishing regions where the element Mg, which is an element contained in forsterite, is present as regions where forsterite is present and measuring the ratio of the area of the regions where forsterite is present to the area of the non-magnetic phase.

The strength of the multilayer body is improved when 2 vol % to 8 vol % of the non-magnetic phase consists of forsterite.

The insulating layers preferably contain B at from 2 wt % to 11 wt % in terms of $B_2O_3$, Si at from 18 wt % to 66 wt % in terms of $SiO_2$, Fe at from 13 wt % to 52 wt % in terms of $Fe_2O_3$, Ni at from 1 wt % to 7 wt % in terms of NiO, Zn at from 4 wt % to 16 wt % in terms of ZnO, and Cu at from 1 wt % to 5 wt % in terms of CuO.

The composition of the insulating layers is confirmed by analysis performed using inductively coupled plasma atomic emission/mass spectrometry (ICP-AES/MS).

Next, an example of a coil built into the multilayer body of the multilayer coil component will be described.

The coil is formed by electrically connecting together a plurality of coil conductors, which are stacked in the stacking direction together with the insulating layers.

Figure 2:
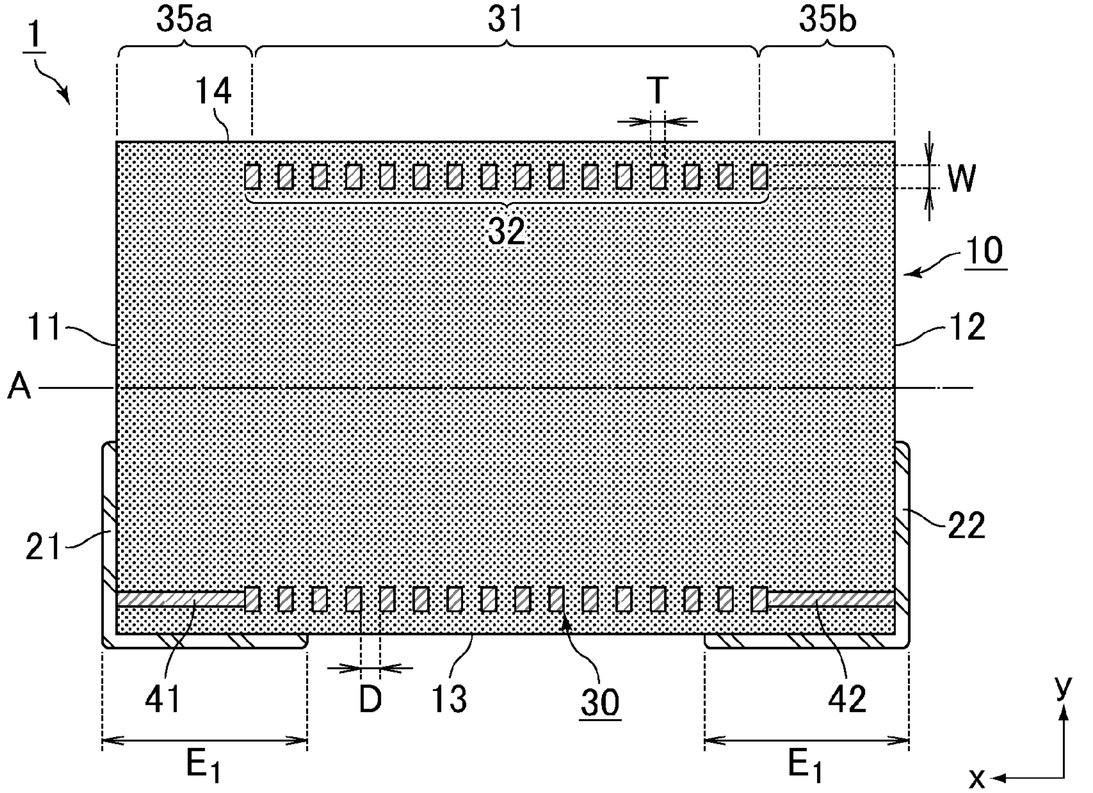
FIG. 2 is a sectional view schematically illustrating an example of the multilayer coil component of the present disclosure.
Figure 3:
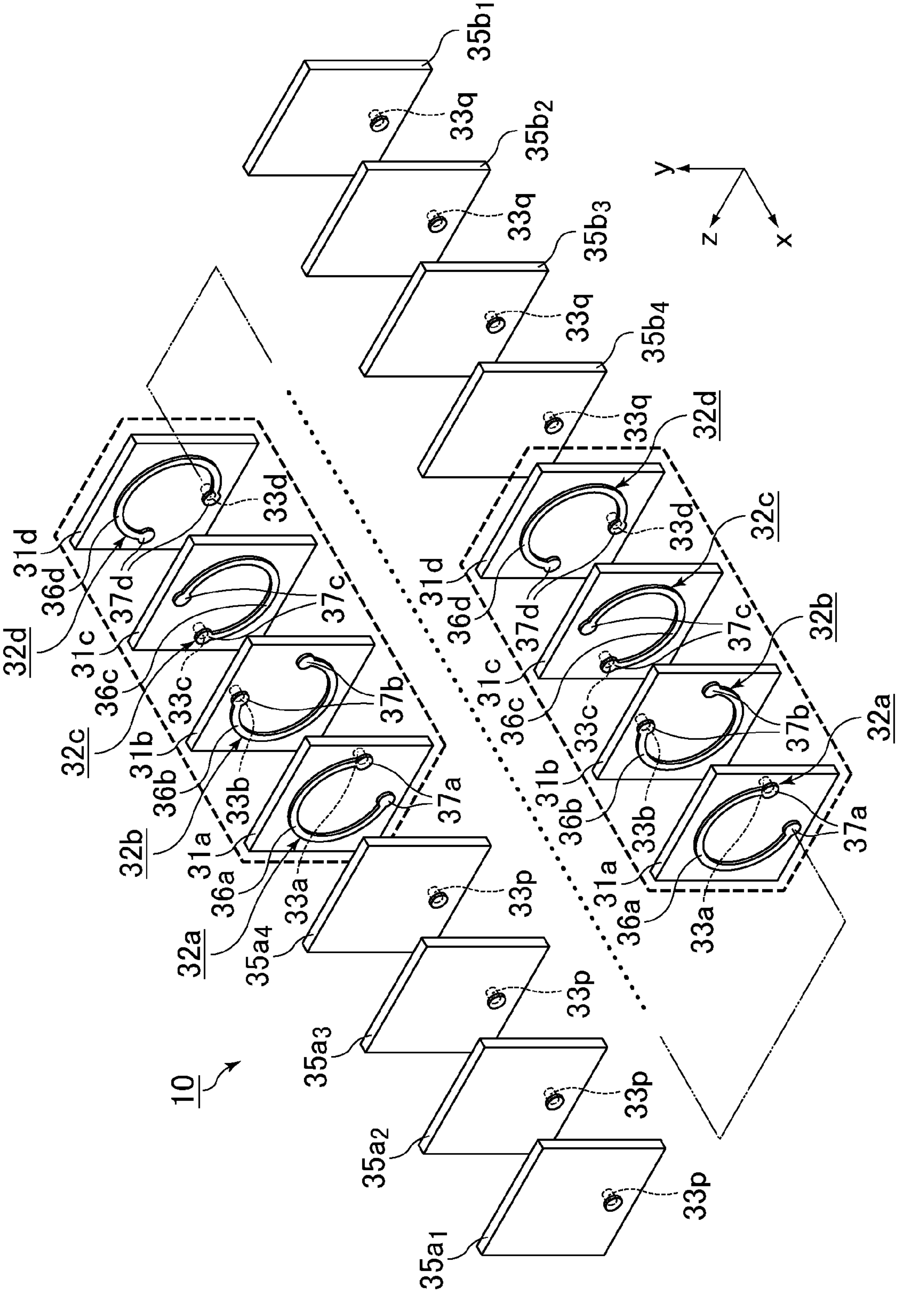
FIG. 3 is an exploded schematic perspective view schematically illustrating the states of insulating layers constituting the multilayer coil component illustrated in FIG. 2.
Figure 4:
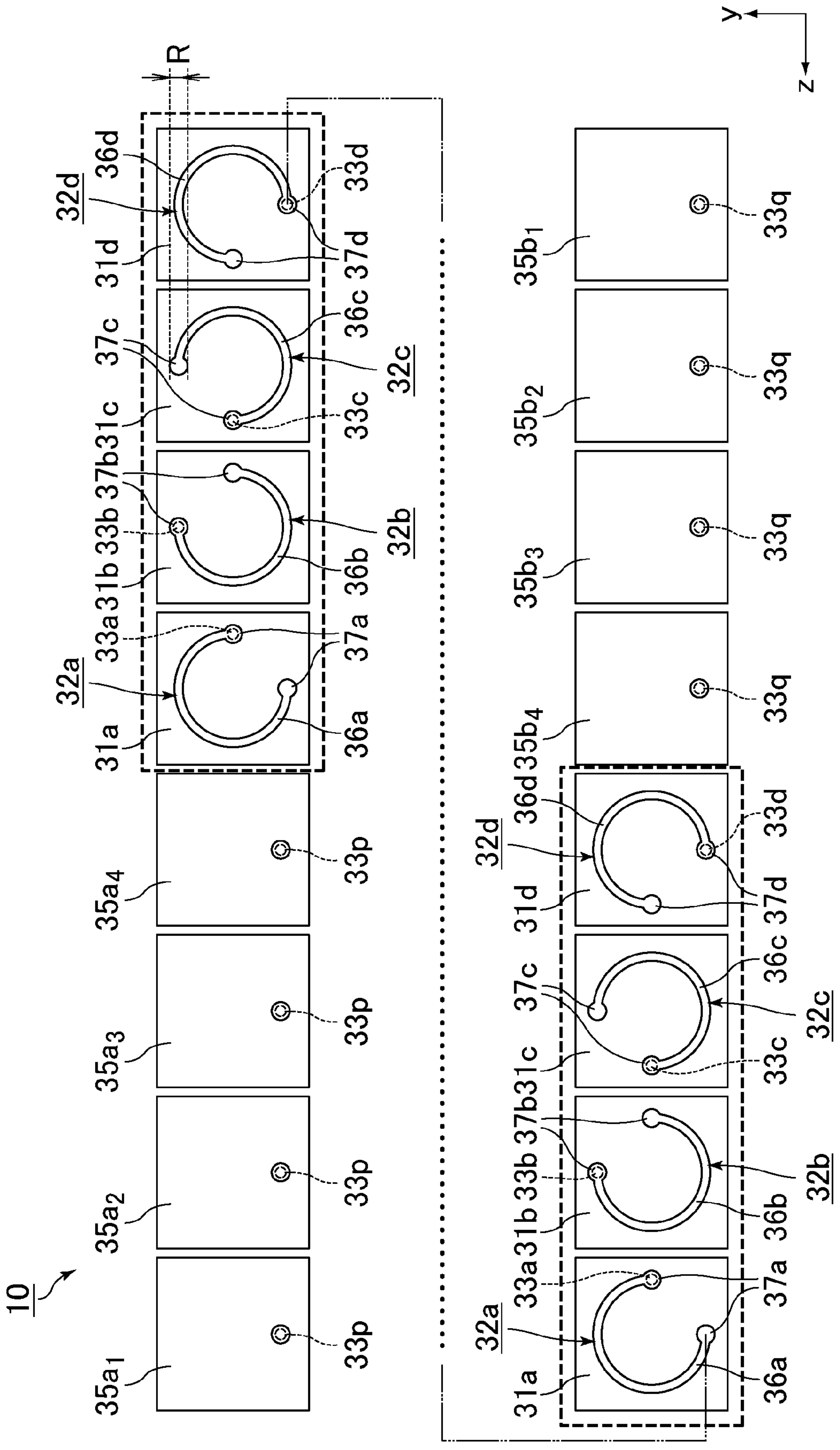
FIG. 4 is an exploded schematic plan view schematically illustrating the states of insulating layers constituting the multilayer coil component illustrated in FIG. 2.

FIG. 2 is a sectional view schematically illustrating an example of a multilayer coil component of the present disclosure, FIG. 3 is an exploded schematic perspective view schematically illustrating the states of insulating layers of the multilayer coil component illustrated in FIG. 2, and FIG. 4 is an exploded schematic plan view schematically illustrating the states of the insulating layers of the multilayer coil component illustrated in FIG. 2.

FIG. 2 illustrates insulating layers, coil conductors, connection conductors, and a stacking direction of the multilayer body in a schematic manner, and the actual shapes, connections, and so forth are not depicted with strict accuracy. For example, the coil conductors are connected to each other by via conductors.

As illustrated in FIG. 2, the multilayer coil component 1 includes: the multilayer body 10 having a coil 30 built into the inside thereof that is formed by electrically connecting together a plurality of coil conductors 32 that are stacked together with insulating layers; and the first outer electrode 21 and the second outer electrode 22, which are electrically connected to the coil 30.

The multilayer body 10 includes a region in which the coil conductors 32 are disposed and regions in which a first connection conductor 41 and a second connection conductor 42 are disposed. The stacking direction of the multilayer body 10 and the axial direction of the coil 30 (coil axis A illustrated in FIG. 2) are parallel to the first main surface 13.

As illustrated in FIGS. 3 and 4, the multilayer body 10 includes an insulating layer 31*a*, an insulating layer 31*b*, an insulating layer 31*c*, and an insulating layer 31*d* as insulating layers 31 in FIG. 2. The multilayer body 10 includes an insulating layer 35$a_1$, an insulating layer 35$a_2$, an insulating layer 35$a_3$, and an insulating layer 35$a_4$ as insulating layers 35*a* in FIG. 2. The multilayer body 10 includes an insulating layer 35$b_1$, an insulating layer 35*b*2, an insulating layer 35$b_3$, and an insulating layer 35$b_4$ as insulating layers 35*b* in FIG. 2.

The coil 30 includes a coil conductor 32*a*, a coil conductor 32*b*, a coil conductor 32*c*, and a coil conductor 32*d* as the coil conductors 32 in FIG. 2.

The coil conductor 32*a*, the coil conductor 32*b*, the coil conductor 32*c*, and the coil conductor 32*d* are respectively disposed on main surfaces of the insulating layer 31*a*, the insulating layer 31*b*, the insulating layer 31*c*, and the insulating layer 31*d*.

The length of each of the coil conductors 32*a*, 32*b*, 32*c*, and 32*d* is the length of ¾ of a turn of the coil 30. In other words, four coil conductors 32 are stacked on top of one another in order to form three turns of the coil 30. In the multilayer body 10, the coil conductor 32*a*, the coil conductor 32*b*, the coil conductor 32*c*, and the coil conductor 32*d* are repeatedly stacked as a single unit (three turns).

The coil conductor 32*a* includes a line portion 36*a* and a land portion 37*a* disposed at an end portion of the line portion 36*a*. The coil conductor 32*b* includes a line portion 36*b* and a land portion 37*b* disposed at an end portion of the line portion 36*b*. The coil conductor 32*c* includes a line portion 36*c* and a land portion 37*c* disposed at an end portion of the line portion 36*c*. The coil conductor 32*d* includes a line portion 36*d* and a land portion 37*d* disposed at an end portion of the line portion 36*d*.

A via conductor 33*a*, a via conductor 33*b*, a via conductor 33*c*, and a via conductor 33*d* are disposed so as to respectively penetrate through the insulating layer 31*a*, the insulating layer 31*b*, the insulating layer 31*c*, and the insulating layer 31*d* in the stacking direction.

The insulating layer 31*a* provided with the coil conductor 32*a* and the via conductor 33*a*, the insulating layer 31*b* provided with the coil conductor 32*b* and the via conductor 33*b*, the insulating layer 31*c* provided with the coil conductor 32*c* and the via conductor 33*c*, and the insulating layer 31*d* provided with the coil conductor 32*d* and the via conductor 33*d* are repeatedly stacked as a single unit (parts surrounded by dotted lines in FIGS. 3 and 4). Thus, the land portion 37*a* of the coil conductor 32*a*, the land portion 37*b* of the coil conductor 32*b*, the land portion 37*c* of the coil conductor 32*c*, and the land portion 37*d* of the coil conductor 32*d* are connected to each other by the via conductor 33*a*, the via conductor 33*b*, and the via conductor 33*c*, and the via conductor 33*d*. In other words, the land portions of coil conductors that are adjacent to each other in the stacking direction are connected to each other by the via conductors.

The solenoid-shaped coil 30 built into the multilayer body 10 is formed in the above-described manner.

In plan view in the stacking direction, the coil 30 formed of the coil conductors 32*a*, the coil conductors 32*b*, the coil conductors 32*c*, and the coil conductors 32*d* may have a circular shape or may have a polygonal shape. In the case where the coil 30 has a polygonal shape in plan view in the stacking direction, the coil diameter of the coil 30 is the diameter of an equivalent-area circle of the polygonal shape and the coil axis of the coil 30 is an axis that extends in the stacking direction through the center of the polygonal shape.

Via conductors 33*p* are disposed so as to penetrate in the stacking direction through the insulating layer 35$a_1$, the insulating layer 35$a_2$, the insulating layer 35$a_3$, and the insulating layer 35$a_4$. Land portions connected to the via conductors 33*p* may be disposed on the main surfaces of the insulating layer 35$a_1$, the insulating layer 35$a_2$, the insulating layer 35$a_3$, and the insulating layer 35$a_4$.

The insulating layer 35$a_1$ provided with the via conductor 33*p*, the insulating layer 35$a_2$ provided with the via conductor 33*p*, the insulating layer 35$a_3$ provided with the via conductor 33*p*, and the insulating layer 35$a_4$ provided with the via conductor 33*p* are stacked so as to overlap the insulating layer 31*a* provided with the coil conductor 32*a* and the via conductor 33*a*. As a result, the via conductors 33*p* are connected to each other and form the first connection conductor 41 and the first connection conductor 41 is exposed at the first end surface 11. As a result, the first outer electrode 21 and the coil 30 (coil conductor 32*a*) are connected to each other via the first connection conductor 41.

The first connection conductor 41 is preferably connected in a straight line between the first outer electrode 21 and the coil 30. The phrase "the first connection conductor 41 is connected in a straight line between the first outer electrode 21 and the coil 30" means that the via conductors 33*p* forming the first connection conductor 41 overlap one another in plan view in the stacking direction and it is not necessary for the via conductors 33*p* to be perfectly aligned in a straight line.

Via conductors 33*q* are disposed so as to penetrate in the stacking direction through the insulating layer 35$b_1$, the insulating layer 35$b_2$, the insulating layer 35$b_3$, and the insulating layer 35$b_4$. Land portions connected to the via conductors 33_q_ may be disposed on the main surfaces of the insulating layer 35_b_1, the insulating layer 35_b_2, the insulating layer 35_b_3, and insulating layer 35_b_4.

The insulating layer $35b_1$ provided with the via conductor 33_q_, the insulating layer $35b_2$ provided with the via conductor 33_q_, the insulating layer $35b_3$ provided with the via conductor 33_q_, and the insulating layer $35b_4$ provided with the via conductor 33_q_ are stacked so as to overlap the insulating layer 31_d_ provided with the coil conductor 32_d_ and the via conductor 33_d_. As a result, the via conductors 33_q_ are connected to each other and form the second connection conductor 42 and the second connection conductor 42 is exposed at the second end surface 12. As a result, the second outer electrode 22 and the coil 30 (coil conductor 32_d_) are connected to each other via the second connection conductor 42.

The second connection conductor 42 is preferably connected in a straight line between the second outer electrode 22 and the coil 30. The phrase "the second connection conductor 42 is connected in a straight line between the second outer electrode 22 and the coil 30" means that the via conductors 33_q_ forming the second connection conductor 42 overlap one another in plan view in the stacking direction and it is not necessary for the via conductors 33_q_ to be perfectly aligned in a straight line.

In the case where land portions are connected to the via conductors 33_p_ forming the first connection conductor 41 and the via conductors 33_q_ forming the second connection conductor 42, the shape of the first connection conductor 41 and the shape of the second connection conductor 42 refer to the shapes without the land portions.

In FIGS. 3 and 4, a case is exemplified in which four coil conductors 32 are stacked in order to form three turns of the coil 30, i.e., the repeating shape is the shape of ¾ of a turn, but the number of coil conductors 32 that are stacked in order to form one turn of the coil is not particularly limited.

For example, the number of coil conductors stacked in order to form one turn of the coil may be two, i.e., the repeating shape may be the shape of ½ a turn.

The coil conductors forming the coil preferably overlap in plan view in the stacking direction. In addition, the coil preferably has a circular shape in plan view in the stacking direction. In the case where the coil includes land portions, the shape of the coil is taken to be the shape obtained when the land portions are removed (i.e., the shape of the line portions).

In addition, in the case where land portions are connected to the via conductors forming the connection conductors, the shape of the connection conductors is the shape obtained when the land portions are removed (i.e., the shape of the via conductors).

The coil conductors illustrated in FIG. 3 are shaped so that the repeating pattern has a circular shape, but the coil conductors may instead be shaped so that the repeating pattern has a polygonal shape such as a quadrangular shape.

In addition, the repeating shape of the coil conductors may be a ½ turn shape rather than a ¾ turn shape.

The first outer electrode and the second outer electrode may have a single layer structure or may have a multilayer structure.

When the first outer electrode and the second outer electrode each have a single layer structure, for example, silver, gold, copper, palladium, nickel, aluminum, or an alloy containing at least one of these metals may be used as the constituent material of the outer electrodes.

When the first outer electrode and the second outer electrode each have a multilayer structure, each outer electrode may include, for example, a base electrode layer containing silver, a nickel coating, and a tin coating in order from the side near the surface of the multilayer body.

In a multilayer coil component having the configuration illustrated in FIGS. 2, 3, and 4, when the size of the multilayer coil component is the 0603 size, the multilayer coil component is preferably designed as follows in order to further improve the high-frequency characteristics.

The number of turns of the coil is preferably from 33 turns to 42 turns. When the number of turns lies in this range, the total electrostatic capacitance between the coil conductors can be reduced and therefore the transmission coefficient S21 can be made to lie in a suitable range.

In addition, the coil length is preferably from 0.49 mm to 0.55 mm.

The width of the coil conductors is preferably from 45 μm to 75 μm. The width of the coil conductors is a dimension indicated by double arrows W in FIG. 2.

The thickness of the coil conductors is preferably from 3.5 μm to 6.0 μm. The thickness of the coil conductors is a dimension indicated by double arrows T in FIG. 2.

The distance between the coil conductors is preferably from 3.0 μm to 5.0 μm. The distance between the coil conductors is a dimension indicated by double arrows D in FIG. 2.

The diameter of the land portions of the coil conductors is preferably from 30 μm to 50 μm. The diameter of the land portions of the coil conductors is a dimension indicated by double arrows R in FIG. 4.

When the first main surface of the multilayer body is used as the mounting surface, the length of the part of the first outer electrode that covers the first main surface of the multilayer body and the length of the part of the second outer electrode that covers the first main surface of the multilayer body are preferably 0.20 mm or lower. Furthermore, these lengths are preferably 0.10 mm or higher.

The length of the part of the first outer electrode covering the first main surface of the multilayer body and the length of the part of the second outer electrode covering the first main surface of the multilayer body are dimensions indicated by double arrows $E_1$ in FIG. 2.

In addition, the relative dielectric constant of the insulating layers constituting the multilayer coil component of the present disclosure is preferably from 4.0 to 10.0, more preferably from 4.0 to 8.0, and still more preferably from 4.0 to 7.0.

The relative dielectric constant of the insulating layers constituting the multilayer coil component can be measured in the following manner.

A dielectric constant measurement test piece is prepared by molding an insulating layer into a prescribed shape (for example, a disk shape). Electrodes are formed on both sides of the test piece, and then the dielectric constant is measured under a condition of a frequency of 1 MHz using an impedance analyzer (for example, E4991A made by Agilent Technologies Inc.).

In addition, the magnetic permeability of the insulating layers constituting the multilayer coil component of the present disclosure is preferably from 1.5 to 25.0, more preferably from 1.7 to 8.5, and still more preferably from 2.5 to 5.0.

The magnetic permeability of the insulating layers constituting the multilayer coil component can be measured in the following manner.

A magnetic permeability measurement test piece is prepared by molding an insulating layer into a prescribed shape (for example, a ring-like shape). The test piece is placed in a magnetic permeability measurement instrument, and the magnetic permeability is then measured under a condition of a frequency of 1 MHz using an impedance analyzer (for example, E4991A made by Agilent Technologies Inc.).

The multilayer coil component of the present disclosure is manufactured using the following method, for example.

Magnetic Material Manufacturing Process $Fe_2O_3$, ZnO, CuO, and NiO are weighed so as to be at a prescribed ratio. These oxides may contain unavoidable impurities. Next, a slurry is prepared by wet mixing these weighed materials together and then pulverizing the materials. At this time, additives such as $Mn_3O_4$, $Bi_2O_3$, $Co_3O_4$, $SiO_2$, and $SnO_2$ may be added. The resulting slurry is dried and then preliminarily fired. The preliminary firing temperature is, for example, from 700° C. to 800° C. The preliminary firing time is from 2 hours to 5 hours, for example. In this way, a powdered ferrite material is prepared as the magnetic material.

The ferrite material preferably contains $Fe_2O_3$ at from 40 mol % to 49.5 mol %, ZnO at from 2 mol % to 35 mol %, CuO at from 6 mol % to 13 mol %, and NiO at from 10 mol % to 45 mol %.

Non-Magnetic Material Manufacturing Process

A non-magnetic material powder is weighed. A glass powder containing an alkali metal, such as potassium, and boron, silicon, and aluminum in prescribed proportions is prepared as borosilicate glass. Furthermore, a forsterite powder is prepared as a filler. Quartz powder may be additionally prepared as a filler.

The borosilicate glass preferably contains Si at from 70 wt % to 85 wt % in terms of $SiO_2$, B at from 10 wt % to 25 wt % in terms of $B_2O_3$, an alkali metal A at from 0.5 wt % to 5 wt % in terms of $A_2O$, and Al at from 0 wt % to 5 wt % in terms of $Al_2O_3$.

Green Sheet Manufacturing Process

The magnetic material and the non-magnetic material are weighed in a prescribed ratio. Next, these weighed materials are mixed with an organic binder such as polyvinyl butyral resin, an organic solvent such as ethanol or toluene, a plasticizer, and so forth and then the mixture is pulverized to produce a slurry. The obtained slurry is then molded into a sheet of a prescribed thickness using a doctor blade method or the like and then punched into a prescribed shape such as a rectangular shape to produce green sheets.

The thickness of the green sheets is preferably from 20 μm to 30 μn.

The magnetic material and the non-magnetic material are preferably mixed after adjusting the ratio of the volume of the non-magnetic material to the total volume of the magnetic material and the non-magnetic material to be preferably from 50 vol % to 90 vol %, more preferably from 60 vol % to 90 vol %, and still more preferably from 70 vol % to 90 vol %.

Conductor Pattern Forming Process

First, via holes are formed by performing laser irradiation at prescribed locations on the green sheets.

Next, a conductive paste such as a silver paste is applied to the surfaces of the green sheets while filling the via holes by using a screen printing method or the like. Thus, coil-conductor conductor patterns, which are connected to via-conductor conductor patterns, are formed on the surfaces of the green sheets while forming the via-conductor conductor patterns inside the via holes in the green sheets. In this way, coil sheets are manufactured in which the coil-conductor conductor patterns and the via-conductor conductor patterns are formed on and in the green sheets. A plurality of the coil sheets are manufactured and coil-conductor conductor patterns corresponding to the coil conductors illustrated in FIGS. 3 and 4 and via-conductor conductor patterns corresponding to the via conductors illustrated in FIGS. 3 and 4 are formed on and in the coil sheets.

In addition, separately from the coil sheets, via sheets are manufactured in which via-conductor conductor patterns are formed in the green sheets by filling the via holes in the green sheets with a conductive paste such as a silver paste using a screen printing method or the like. A plurality of the via sheets are manufactured and via-conductor conductor patterns corresponding to the via conductors illustrated in FIGS. 3 and 4 are formed in the via sheets.

Multilayer Body Block Manufacturing Process

A multilayer body block is manufactured by stacking the coil sheets and the via sheets in the stacking direction in the order illustrated in FIGS. 3 and 4 and then subjecting the stacked sheets to thermal pressure bonding.

Multilayer Body and Coil Manufacturing Process

First, individual chips are manufactured by cutting the multilayer body block into pieces of a prescribed size using a dicer or the like.

Next, the individual chips are fired. The firing temperature is, for example, from 900° C. to 920° C. Furthermore, the firing time is from 2 hours to 4 hours, for example. The oxygen concentration at the top temperatures from 900° C. to 920° C. is, for example, from 0.01 vol % to 0.5 vol %. Grain growth of the crystal grains constituting the magnetic phase can be suppressed and the grain size of the crystal grains constituting the magnetic phase after firing can be made small by setting the oxygen concentration at the top temperatures to be from 0.01 vol % to 0.5 vol %.

By firing the individual chips, the green sheets of the coil sheets and the via sheets become insulating layers. As a result, multilayer bodies in each of which a plurality of insulating layers are stacked in the stacking direction, in this case, length direction are manufactured. The magnetic phase and the non-magnetic phase are formed in each multilayer body.

The coil-conductor conductor patterns and the via-conductor conductor patterns of the coil sheets become the coil conductors and the via conductors when the individual chips are fired. As a result, coils are manufactured in which a plurality of coil conductors are electrically connected to each other by the via conductors while being stacked in the stacking direction.

In this way, a multilayer body and a coil provided inside the multilayer body are manufactured. The stacking direction of the insulating layers and the direction of the coil axis of the coil are parallel to the first main surface, which is the mounting surface, of the multilayer body and are parallel to the length direction in this case.

The via-conductor conductor patterns of the via sheets become the via conductors when the individual chips are fired. As a result, the first connection conductor and the second connection conductor are manufactured in which the plurality of via conductors are electrically connected to each other while being stacked in the length direction. The first connection conductor is exposed from the first end surface of the multilayer body. The second connection conductor is exposed from the second end surface of the multilayer body.

The corner portions and edge portions of the multilayer body may be rounded by performing barrel polishing, for example.

Outer Electrode Forming Process

First, a conductive paste containing silver and glass frit is applied to the first end surface and the second end surface of the multilayer body. Next, the base electrode layers are formed on the surfaces of the multilayer body by baking the resulting coatings. More specifically, a base electrode layer is formed so as to extend from the first end surface of the multilayer body across part of the first main surface, part of the first side surface, and part of the second side surface. In addition, a base electrode layer is formed so as to extend from the second end surface of the multilayer body across part of the first main surface, part of the first side surface, and part of the second side surface. The baking temperature of the coatings is from 800° C. to 820° C., for example.

After that, a nickel coating and a tin coating are sequentially formed on the surface of each base electrode layer by performing electrolytic plating or the like.

Thus, the first outer electrode that is electrically connected to the coil via the first connection conductor and the second outer electrode that is electrically connected to the coil via the second connection conductor are formed.

Thus, the multilayer coil component is manufactured.

EXAMPLES

Hereafter, examples that disclose the multilayer coil component according to the present disclosure in a more specific manner will be described. The present disclosure is not limited to the following examples.

Examples 1 to 6 and Comparative Examples 1 and 2

Multilayer bodies for multilayer coil components of Examples 1 to 6 and Comparative Examples 1 and 2 were manufactured using the following method.

Magnetic Material Manufacturing Process

The main components were weighed so as to obtain a ratio of 48.0 mol % $Fe_2O_3$, 30.0 mol % ZnO, 14.0 mol % NiO, and 8.0 mol % CuO. Next, a slurry was manufactured by putting these weighed materials, pure water, and a dispersant into a ball mill along with PSZ media, mixing these materials together, and then pulverizing the mixture. The resulting slurry was dried and then preliminarily fired for two hours at 800° C. In this way, a powdered ferrite material was prepared as the magnetic material.

Non-Magnetic Material Manufacturing Process

Borosilicate glass powder containing Si, B, K, and Al in prescribed proportions, and forsterite powder and quartz powder as fillers were prepared. The borosilicate glass powder, the forsterite powder, and the quartz powder were weighed to obtain a ratio of borosilicate glass:forsterite:quartz=72:4:24 by weight. Next, a slurry was manufactured by putting these weighed materials, pure water, and a dispersant into a ball mill along with PSZ media, mixing these materials together, and then pulverizing the mixture. Then, a powdered non-magnetic material was manufactured by drying the obtained slurry.

Green Sheet Manufacturing Process

The magnetic material and the non-magnetic material were weighed so that the volume ratio between the magnetic material and the non-magnetic material had the values listed in Table 1 and Table 2 below. Next, a slurry was manufactured by putting these weighed materials, a polyvinyl butyral resin serving as an organic binder, and ethanol and toluene serving as organic solvents into a ball mill along with PSZ media, mixing these material together, and then pulverizing the mixture. The obtained slurry was then molded into a sheet of a prescribed thickness using a doctor blade method and then punched into a prescribed shape to produce green sheets.

Conductor Pattern Forming Process

An inner-conductor conductive paste containing silver powder and an organic vehicle was prepared.

Coil sheets were obtained by forming via holes at prescribed locations in green sheets, forming via conductors by filling the via holes with the conductive paste, and forming coil conductor patterns by performing printing.

Separately, via holes were formed by irradiating prescribed locations on green sheets with a laser. Via sheets were obtained by forming via conductors by filling the via holes with the conductive paste.

Multilayer Body Block Manufacturing Process

A multilayer body block was manufactured by stacking the coil sheets and the via sheets in the stacking direction in the order illustrated in FIGS. 3 and 4 and then subjecting the stacked sheets to thermal pressure bonding.

Multilayer Body and Coil Manufacturing Process

Individual chips were manufactured by cutting the multilayer body block into individual pieces using a dicer. Next, multilayer bodies were obtained by firing the individual chips. The firing was performed with a top temperature of 920° C. that was maintained for 4 hours. During this time, the oxygen concentration was 0.1 vol %. The temperature was allowed to fall in the atmosphere. A ferrite phase, i.e., the magnetic phase, and the non-magnetic phase were formed in each multilayer body.

Outer Electrode Forming Process

An outer-electrode conductive paste containing silver powder and glass frit was poured into a coating forming tank in order to form coating film of a prescribed thickness. The places where the outer electrodes are to be formed on each multilayer body were immersed in the coating film.

After the immersion, each multilayer body was baked at a temperature of around 800° C. and in this way the base electrode layers of the outer electrodes were formed. The thickness of the base electrode layers was around 5 μm.

Next, the outer electrodes were formed by sequentially forming a nickel coating and a tin coating on each base electrode layer by performing electrolytic plating.

The multilayer coil components of Examples 1 to 6 and Comparative Examples 1 and 2 were manufactured as described above.

Regarding the size of each manufactured multilayer coil component, the dimension in the length direction was 0.6 mm, the dimension in the height direction was 0.3 mm, and the dimension in the width direction was 0.3 mm.

Examples 1 to 6 have a composition in which the mixing ratio of the magnetic material and the non-magnetic material was varied, Comparative Example 1 has a composition in which the magnetic material was not used, and Comparative Example 2 has a composition in which the non-magnetic material was not used.

In addition, disk-shaped test pieces having an outer diameter of 10 mm and a thickness of around 0.5 mm after firing and ring-shaped test pieces having an outer diameter of 20 mm, an inner diameter of 12 mm, and a thickness of 1.5 mm after firing were manufactured from the manufactured green sheets. The firing was performed with a top temperature of 920° C. that was maintained for 4 hours as described above. During this time, the oxygen concentration was 0.1 vol %. The temperature was allowed to fall in the atmosphere.

Measurement of Composition

The compositions were confirmed by performing analysis using the disk-shaped test pieces and inductively coupled plasma atomic emission/mass spectrometry (ICP-AES/MS). The results are illustrated in Table 1 below.

In Table 1, the composition of each component is listed with the total of $K_2O$, $B_2O_3$, $SiO_2$, $Al_2O_3$, MgO, $Fe_2O_3$, NiO, ZnO, and CuO being 100 wt %.

TABLE 1

| | VOL % | | CONSTITUENTS (WT %) | | | | | | | | |
|---|---|---|---|---|---|---|---|---|---|---|---|
| | NON-MAGNETIC MATERIAL | MAGNETIC MATERIAL | $Fe_2O_3$ | ZnO | NiO | CuO | $K_2O$ | $B_2O_3$ | $SiO_2$ | $Al_2O_3$ | MgO |
| COMPARATIVE EXAMPLE 1 | 100 | 0 | 0 | 0 | 0 | 0 | 1.2 | 13.1 | 83.1 | 0.2 | 2.4 |
| EXAMPLE 1 | 90 | 10 | 13.9 | 4.3 | 1.9 | 1.1 | 1.0 | 10.4 | 65.3 | 0.2 | 1.9 |
| EXAMPLE 2 | 80 | 20 | 24.7 | 7.6 | 3.3 | 2 | 0.8 | 8.2 | 51.8 | 0.1 | 1.5 |
| EXAMPLE 3 | 70 | 30 | 33.3 | 10.3 | 4.5 | 2.7 | 0.6 | 6.5 | 40.8 | 0.1 | 1.2 |
| EXAMPLE 4 | 60 | 40 | 40.4 | 12.5 | 5.5 | 3.3 | 0.5 | 5.0 | 31.8 | 0.1 | 0.9 |
| EXAMPLE 5 | 50 | 50 | 46.3 | 14.4 | 6.3 | 3.8 | 0.4 | 3.8 | 24.2 | 0.1 | 0.7 |
| EXAMPLE 6 | 40 | 60 | 51.3 | 15.9 | 6.9 | 4.2 | 0.3 | 2.8 | 18.0 | 0.1 | 0.5 |
| COMPARATIVE EXAMPLE 2 | 0 | 100 | 65.5 | 20.3 | 8.8 | 5.4 | 0 | 0 | 0 | 0 | 0 |

Measurement of Relative Dielectric Constant

Electrodes were formed on both sides of the disk-shaped test pieces and then the relative dielectric constant $\varepsilon_r$ was measured at a measurement frequency of 1 MHz using an impedance analyzer (E4991A made by Agilent Technologies Inc.). The results are illustrated in Table 2 below.

Measurement of Magnetic Permeability

The ring-shaped test pieces were placed in a magnetic permeability measurement instrument (16454A-s made by Agilent Technologies Inc.), and the magnetic permeability $\mu$ was measured at a measurement frequency of 1 MHz using an impedance analyzer (E4991A made by Agilent Technologies Inc.). The results are illustrated in Table 2 below.

Measurement of Grain Sizes D50 and D90

Each manufactured multilayer coil component was stood vertically with the second main surface exposed and the periphery of the multilayer coil component was fixed in place with resin. Next, the multilayer coil component was ground down to approximately the center thereof in the height direction using a grinder. Scanning electron microscope (SEM) images of the obtained cross sections were taken at a magnification of 10000×, and D50 and D90 of the crystal grains constituting the magnetic phase were determined using image processing software. The results are illustrated in Table 2 below.

D50 and D90 are respectively equivalent-area circle diameters of 50% and 90% on a cumulative sum basis in a cumulative distribution of equivalent-area circle diameters of the crystal grains.

Furthermore, since the magnetic phase is relatively dark and the non-magnetic phase is relatively bright in the SEM images, only the crystal grains constituting the magnetic phase were extracted by binarizing the SEM images using a prescribed threshold value, and their grain sizes (equivalent-area circle diameters) were evaluated.

X-Ray Diffraction

The prepared disk-shaped test pieces were pulverized into a powder and evaluated using X-ray diffraction in order to measure the full width at half maximum of the diffraction peak originating from the (642) plane of the magnetic phase. A Cu-K$\alpha$1 line was used as the X-ray source.

Figure 5:
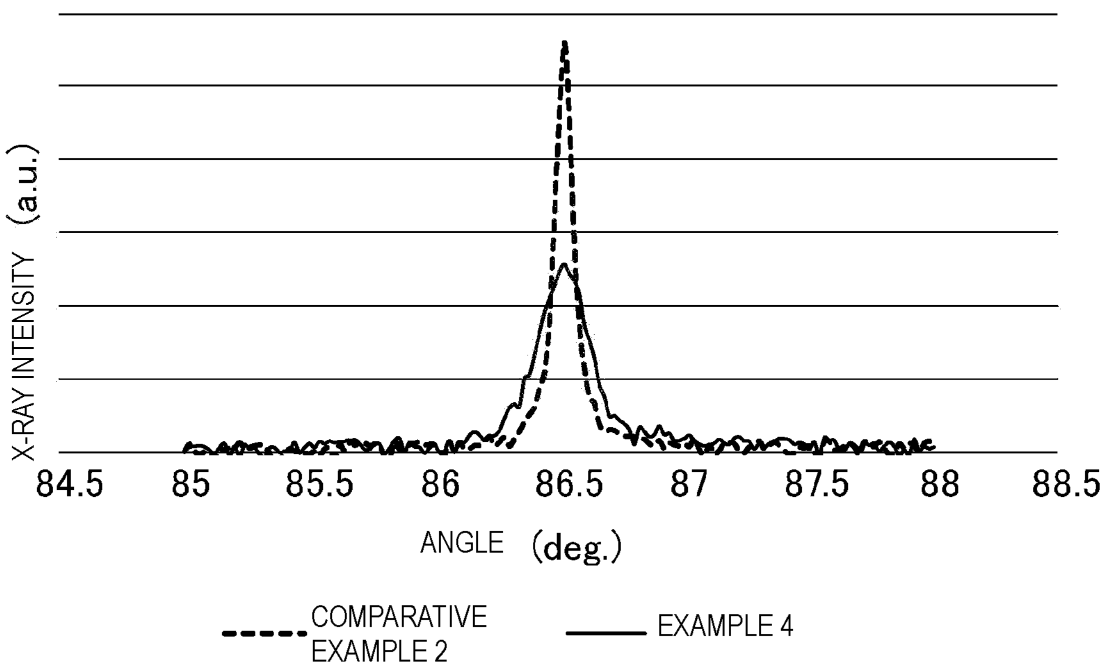
FIG. 5 illustrates X-ray diffraction patterns for test pieces prepared in Example 4 and Comparative Example 2.

FIG. 5 illustrates X-ray diffraction patterns for test pieces prepared in Example 4 and Comparative Example 2.

As illustrated in FIG. 5, the full width at half maximum of the diffraction peak of the (642) plane of the spinel structure, which appears between angles (2θ)=86 to 87°, was measured as the full width at half maximum of the diffraction peak originating from the (642) plane of the magnetic phase.

The results are illustrated in Table 2 below.

TABLE 2

| | VOL % | | CRYSTAL GRAIN SIZE (nm) | | FULL WIDTH AT HALF MAXIMUM OF (642) PLANE DIFFRACTION PEAK (°) | MAGNETIC PERMEABILITY u(-) | RELATIVE DIELECTRIC CONSTANT $\varepsilon_r$(-) |
|---|---|---|---|---|---|---|---|
| | NON-MAGNETIC MATERIAL | MAGNETIC MATERIAL | D50 | D90 | | | |
| COMPARATIVE EXAMPLE 1 | 100 | 0 | — | — | — | 1 | 3.9 |
| EXAMPLE 1 | 90 | 10 | 100 | 280 | 0.42 | 1.7 | 4.5 |
| EXAMPLE 2 | 80 | 20 | 160 | 380 | 0.39 | 2.9 | 5.6 |
| EXAMPLE 3 | 70 | 30 | 250 | 500 | 0.35 | 5.0 | 6.5 |
| EXAMPLE 4 | 60 | 40 | 380 | 660 | 0.31 | 8.3 | 7.6 |
| EXAMPLE 5 | 50 | 50 | 530 | 1100 | 0.27 | 14 | 8.7 |
| EXAMPLE 6 | 40 | 60 | 710 | 1400 | 0.24 | 24 | 9.5 |
| COMPARATIVE EXAMPLE 2 | 0 | 100 | 1300 | 2200 | 0.09 | 200 | 14.4 |

Measurement of Transmission Coefficient S21

Figure 6:
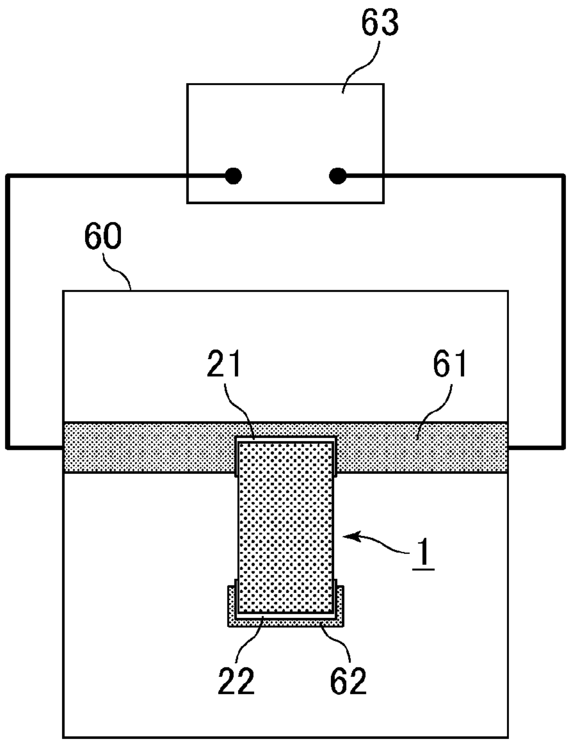
FIG. 6 is a diagram schematically illustrating a method of measuring the transmission coefficient S21.

FIG. 6 is a diagram schematically illustrating a method of measuring the transmission coefficient S21.

As illustrated in FIG. 6, the manufactured multilayer coil component 1 was soldered to a measurement jig 60 provided with a signal path 61 and a ground conductor 62. The first outer electrode 21 of the multilayer coil component 1 was connected to the signal path 61 and the second outer electrode 22 of the multilayer coil component 1 was connected to the ground conductor 62.

The transmission coefficient S21 was measured by obtaining the power of an input signal to the test piece and the power of a transmitted signal from the test piece and changing the signal frequency using a network analyzer 63. The two ends of the signal path 61 were connected to the network analyzer 63.

Figure 7:
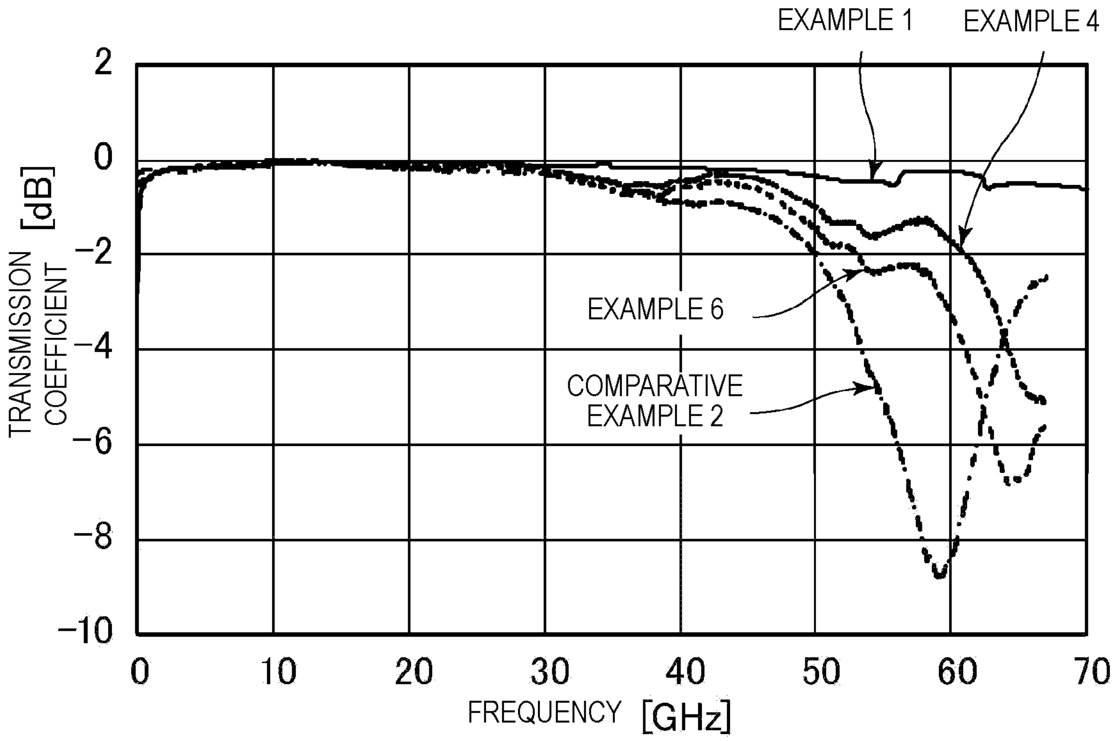
FIG. 7 is a graph illustrating the transmission coefficients S21 of test pieces prepared in Examples 1, 4, and 6 and Comparative Example 2.

FIG. 7 is a graph illustrating the transmission coefficients S21 of the multilayer coil components manufactured in Examples 1, 4, and 6 and Comparative Example 2.

The transmission coefficient S21 indicates that the closer the transmission coefficient S21 is to 0 dB, the smaller the loss is.

As illustrated in FIG. 7, the multilayer coil components manufactured in Examples 1, 4, and 6 had larger transmission coefficients S21 in a 60 GHz high-frequency band and had better high-frequency characteristics than the multilayer coil component manufactured in Comparative Example 2.

This is thought to be because the dielectric constant of the insulating layers is reduced and loss in the multilayer coil component caused by LC resonance is reduced due to the inclusion of the non-magnetic phase containing at least Si in the insulating layers constituting the multilayer coil component.

Evaluation of Measured Values and Theoretical Values of Relative Dielectric Constant Disk-shaped test pieces were manufactured as described above while varying the ratio of the volume of the magnetic phase to the total volume of the magnetic phase and the non-magnetic phase, and the relative dielectric constants were measured using the above-described method. Furthermore, the theoretical values of the relative dielectric constants were calculated from the mixing ratios of the magnetic and nonmagnetic phases using a logarithmic mixing rule. The results are illustrated in FIG. 8.

Figure 8:
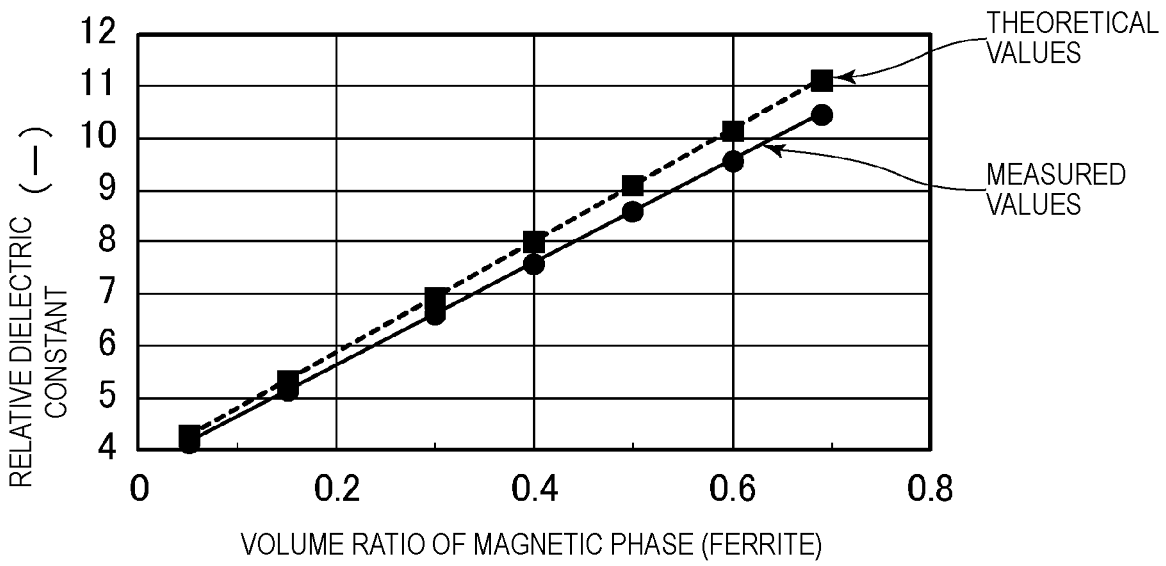
FIG. 8 is a graph illustrating measured and theoretical values of the relative dielectric constants of test pieces having different ratios of the volume of the magnetic phase to the total volume of the magnetic phase and the non-magnetic phase.

FIG. 8 is a graph illustrating the measured and theoretical values of the relative dielectric constants of test pieces having different ratios of the volume of the magnetic phase to the total volume of the magnetic phase and the non-magnetic phase.

As illustrated in FIG. 8, the measured values of the relative dielectric constants were 3 to 6% lower than the theoretical values. This is thought to be because the grain size of the crystal grains of the magnetic phase was smaller due to a mixture of the magnetic phase and the non-magnetic phase being present.

It is thought that the drop in the relative dielectric constant caused by the smaller grain size of the crystal grains of the magnetic phase also contributed to improvement of the high-frequency characteristics of the multilayer coil component.

According to the present disclosure, a multilayer coil component having a magnetic permeability $\mu$ from 1.5 to 25, a relative dielectric constant $\varepsilon_r$ from 4 to 10, and a good transmission coefficient S21 at high frequencies can be obtained.

What is claimed is:

1. A multilayer coil component comprising:

a multilayer body in which a plurality of insulating layers are stacked in a stacking direction, and a coil inside the multilayer body; and outer electrodes that are on surfaces of the multilayer body and are electrically connected to the coil, wherein the multilayer body has a first end surface and a second end surface, which face each other in a length direction, a first main surface and a second main surface, which face each other in a height direction perpendicular to the length direction, and a first side surface and a second side surface, which face each other in a width direction perpendicular to the length direction and the height direction, the outer electrodes include a first outer electrode that extends from at least part of the first end surface of the multilayer body across part of the first main surface, and a second outer electrode that extends from at least part of the second end surface of the multilayer body across part of the first main surface, a stacking direction of the plurality of insulating layers in the multilayer body and a coil axis direction of the coil are parallel to the first main surface, the insulating layers have a magnetic phase having a spinel structure containing at least Fe, Ni, Zn, and Cu and a non-magnetic phase containing at least Si, when grain sizes D50 and D90 of crystal grains constituting the magnetic phase are respectively defined as equivalent-area circle diameters of 50% and 90% on a cumulative sum basis in a cumulative distribution of equivalent-area circle diameters of the crystal grains, the grain size D50 is from 50 nm to 750 nm, and the grain size D90 is from 200 nm to 1500 nm, wherein a full width at half maximum of a diffraction peak originating from a (642) plane of the magnetic phase at $2\theta=86$ to 87° obtained though X-ray diffraction using a Cu-K$\alpha$1 line is from 0.2° to 0.5°.

2. The multilayer coil component according to claim 1, wherein the insulating layers contain B at from 2 wt % to 11 wt % in terms of $B_2O_3$, Si at from 18 wt % to 66 wt % in terms of $SiO_2$, Fe at from 13 wt % to 52 wt % in terms of $Fe_2O_3$, Ni at from 1 wt % to 7 wt % in terms of NiO, Zn at from 4 wt % to 16 wt % in terms of ZnO, and Cu at from 1 wt % to 5 wt % in terms of CuO.

3. A multilayer coil component comprising:

a multilayer body in which a plurality of insulating layers are stacked in a stacking direction, and a coil inside the multilayer body; and outer electrodes that are on surfaces of the multilayer body and are electrically connected to the coil, wherein the multilayer body has a first end surface and a second end surface, which face each other in a length direction, a first main surface and a second main surface, which face each other in a height direction perpendicular to the length direction, and a first side surface and a second side surface, which face each other in a width direction perpendicular to the length direction and the height direction, the outer electrodes include a first outer electrode that extends from at least part of the first end surface of the multilayer body across part of the first main surface, and a second outer electrode that extends from at least part of the second end surface of the multilayer body across part of the first main surface, a stacking direction of the plurality of insulating layers in the multilayer body and a coil axis direction of the coil are parallel to the first main surface, the insulating layers have a magnetic phase having a spinel structure containing at least Fe, Ni, Zn, and Cu and a non-magnetic phase containing at least Si, when grain sizes D50 and D90 of crystal grains constituting the magnetic phase are respectively defined as equivalent-area circle diameters of 50% and 90% on a cumulative sum basis in a cumulative distribution of equivalent-area circle diameters of the crystal grains, the grain size D50 is from 50 nm to 750 nm, and the grain size D90 is from 200 nm to 1500 nm, wherein the insulating layers contain B at from 2 wt % to 11 wt % in terms of $B_2O_3$, Si at from 18 wt % to 66 wt % in terms of $SiO_2$, Fe at from 13 wt % to 52 wt % in terms of $Fe_2O_3$, Ni at from 1 wt % to 7 wt % in terms of NiO, Zn at from 4 wt % to 16 wt % in terms of ZnO, and Cu at from 1 wt % to 5 wt % in terms of CuO.

* * * * *